US011580078B2

(12) United States Patent
Dai et al.

(10) Patent No.: US 11,580,078 B2
(45) Date of Patent: Feb. 14, 2023

(54) PROVIDING ENHANCED SECURITY FOR OBJECT ACCESS IN OBJECT-BASED DATASTORES

(71) Applicant: VMware, Inc., Palo Alto, CA (US)

(72) Inventors: Peng Dai, Boston, MA (US); Tao Xie, Shanghai (CN); Banghui Luo, Shanghai (CN); Zongliang Li, Shanghai (CN)

(73) Assignee: VMWARE, INC., Palo Alto, CA (US)

(*) Notice: Subject to any disclaimer, the term of this patent is extended or adjusted under 35 U.S.C. 154(b) by 293 days.

(21) Appl. No.: 16/872,220

(22) Filed: May 11, 2020

(65) Prior Publication Data

US 2021/0303530 A1 Sep. 30, 2021

(30) Foreign Application Priority Data

Mar. 31, 2020 (WO) ................ PCT/CN2020/082336

(51) Int. Cl.
*G06F 9/455* (2018.01)
*G06F 16/188* (2019.01)
*G06F 16/182* (2019.01)

(52) U.S. Cl.
CPC ........ *G06F 16/188* (2019.01); *G06F 9/45558* (2013.01); *G06F 16/182* (2019.01); *G06F 2009/45595* (2013.01)

(58) Field of Classification Search
CPC ............... G06F 16/188; G06F 9/45558; G06F 2009/45595
See application file for complete search history.

(56) References Cited

U.S. PATENT DOCUMENTS

| 2015/0378761 A1* | 12/2015 | Sevigny .................. G06F 11/16 718/1 |
| 2016/0342814 A1* | 11/2016 | Wang .................... H04L 9/3239 |
| 2017/0124170 A1* | 5/2017 | Koorapati ............... G06F 16/27 |
| 2018/0004559 A1* | 1/2018 | Geml .................. G06F 21/6209 |
| 2018/0136957 A1* | 5/2018 | Guo .................... H04L 63/0428 |

* cited by examiner

*Primary Examiner* — Dong U Kim

(74) *Attorney, Agent, or Firm* — Patterson & Sheridan, LLP

(57) ABSTRACT

A method of enhancing security in object based datastores is provided. The method mounts first and second datastores identified, respectively, by first and second datastore identifiers. The first and second datastores include, respectively, first and second namespace objects that are mapped to first and second subfolders in the first and second datastores. A first file within the first subfolder references a first object via a first object identifier, while a second file within the second subfolder references a second object via a second object identifier. The first and second objects are tagged with the first and second datastores' identifiers. The first and second datastores share an underlying storage and may be configured to have separate access permissions. The method receives a command to access the first object via a datastore identifier, compares the datastore identifier with the first datastore identifier, and if they match, allows access to the first object.

18 Claims, 8 Drawing Sheets

PROVIDING ENHANCED SECURITY FOR OBJECT ACCESS IN OBJECT-BASED DATASTORES

CLAIM OF PRIORITY

The present Application for Patent claims the benefit of PCT Application No. PCT/CN2020/082336, filed Mar. 31, 2020, assigned to the assignee hereof and hereby expressly incorporated by reference herein.

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operations.

A distributed object-based datastore, such as a virtual storage area network (VSAN) datastore, may provide an aggregate object store to virtual machines (VMs) running on host computers (or servers) of a cluster. In the object-based datastore, an object is identified and can be accessed through a universally unique identification (UUID) assigned to the object. If the object's UUID is leaked (e.g., through the object's log file or other means), there is no added security for preventing an unauthorized user from accessing the object. For example, the objects in a datastore may belong to an administrative layer (e.g., for an operator of a datacenter to create/access the objects) or to a workload layer (e.g., for a client of a datacenter to create/access the objects). If an authorized user gains access to an object related to a VM in the administrative layer of a datastore, for example, through the object's UUID, the unauthorized user may be able to manipulate, or even destroy the administrative VM.

DETAILED DESCRIPTION

A common object-based datastore (e.g., a virtual storage area network (VSAN) datastore) does not conventionally have a fine grained security control over accessing the objects. That is, since an object is not an entity type in the virtualization system's inventory hierarchy (unlike a datastore which is an entity type in the inventory architecture), separate security privileges cannot be assigned at the object level. Some embodiments provide a method for enhancing security in accessing objects in an object-based datastore. Some embodiments may enhance the security for accessing the objects by generating one or more datastores (may also be called logical datastores hereinafter) that share the same underlying physical storage. Each of the generated datastores may be assigned a set of security permissions that may be different from the security permissions of other generated datastores.

Some embodiments may improve the security in the object-based datastores by requiring additional permission when a user (or process) attempts to access an object directly (e.g., through the object's UUID). Some embodiments may improve the security by both generating one or more logical datastores, as well as adding an additional layer of security to object access by requiring permission when a request for object access is received. All the aforementioned security features and techniques for implementing these features will be discussed in more detail below.

Figure 1:
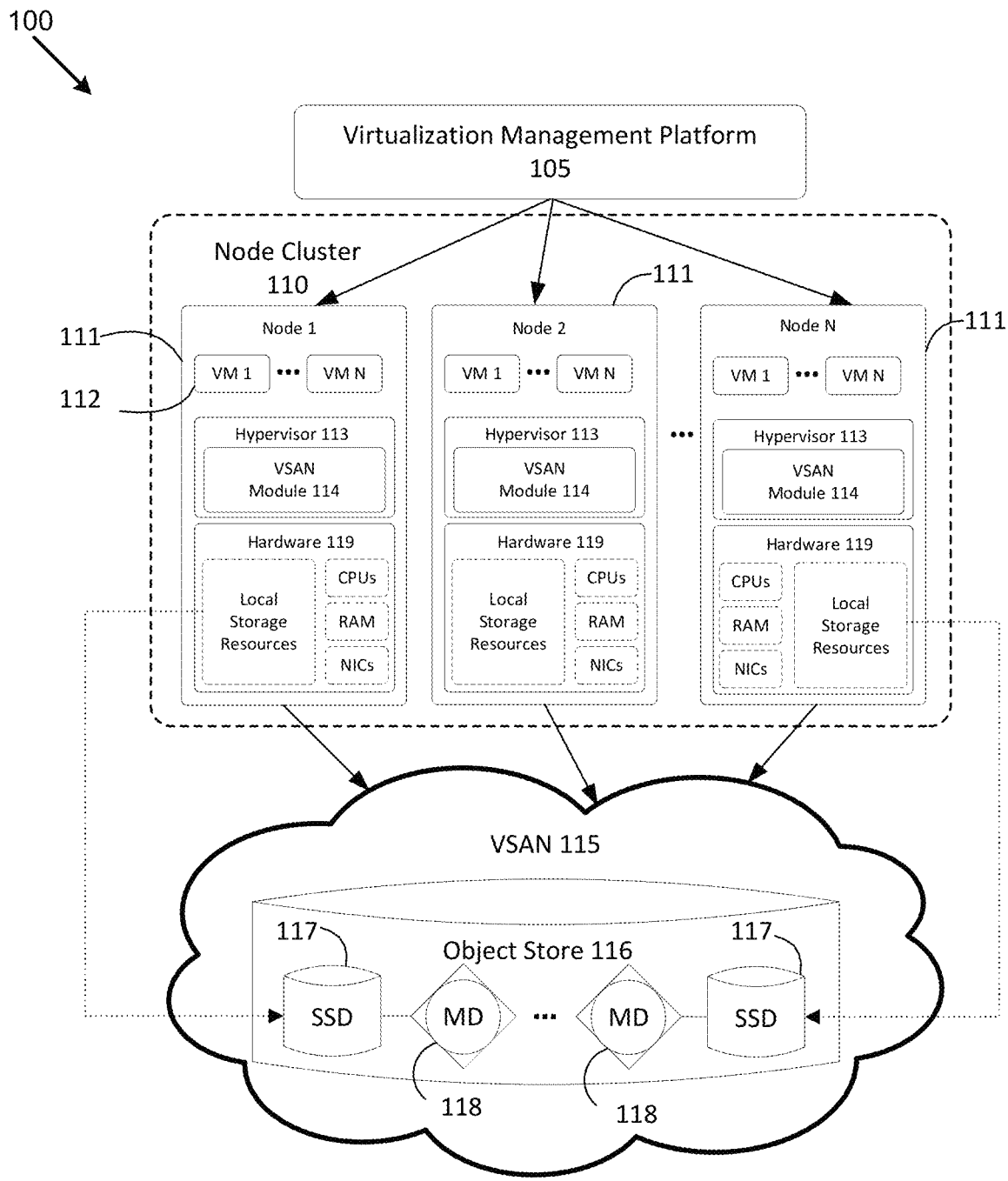
FIG. 1 is a diagram illustrating an example computing environment in which embodiments of the present application may be practiced.

FIG. 1 is a diagram illustrating an example computing environment 100 in which embodiments of the present application may be practiced. As shown, computing environment 100 includes a distributed object-based datastore, such as a software-based "virtual storage area network" (VSAN) environment that leverages the commodity local storage housed in or directly attached (hereinafter, use of the term "housed" or "housed in" may be used to encompass both housed in, or otherwise directly attached) to host servers or nodes 111 of a cluster 110 to provide an aggregate object store 116 to virtual machines (VMs) 112 running on the nodes. The local commodity storage housed in the nodes 111 may include combinations of solid state drives (SSDs) 117 and/or magnetic or spinning disks 118. In certain embodiments, SSDs 117 serve as a read cache and/or write buffer in front of magnetic disks 118 to enhance the I/O performance.

As further discussed below, each node 111 may include a storage management module (referred to herein as a "VSAN module") in order to automate storage management workflows (e.g., create objects in the object store, etc.) and provide access to objects in the object store (e.g., handle I/O operations on objects in the object store, etc.) based on predefined storage policies specified for objects in the object store. For example, because a VM may be initially configured by an administrator to have specific storage requirements for its "virtual disk" depending on its intended use (e.g., capacity, availability, input/output operations per second (TOPS), etc.), the administrator may define a storage profile or policy for each VM specifying such availability, capacity, IOPS and the like. As further described below, the VSAN module may then create an "object" for the specified virtual disk by backing it with physical storage resources of the object store based on the defined policy.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described below, each hypervisor 113, through its corresponding VSAN module 114, may provide access to storage resources located in hardware 119 (e.g., SSDs 117 and magnetic disks 118) for use as storage for storage objects, such as virtual disks (or portions thereof) and other related files that may be accessed by any VM 112 residing in any of nodes 111 in cluster 110.

As will be described in more detail below, the VSAN module 114 may assign a datastore identifier (e.g., in addition to a unique object identifier) to each datastore object. In some embodiments, the objects may be accessed by only authorized user(s) using the assigned datastore identifiers. The VSAN module 114 of some embodiments may also group different name space objects (e.g., virtual machines) that were conventionally associated with a datastore (e.g., a default VSAN datastore) under different logical datastores, and define different access privileges (e.g., read, write, or read/write privileges) for each logical datastore. This way, one or more users that have full access to the objects of one logical datastore may be denied access (or may be granted limited access) to the objects of another logical datastore. Conversely, some particular users (e.g., administrative users) may be granted full access (e.g., read and write operations) to the objects of several (or all) groups of the namespace objects that are grouped under different logical datastores.

In one embodiment, VSAN module 114 may be implemented as a "VSAN" device driver within hypervisor 113. In such an embodiment, VSAN module 114 may provide access to a conceptual "VSAN" 115 through which an administrator can create a number of top-level "device" or namespace objects that are backed by object store 116. For example, during creation of a device object, the administrator may specify a particular file system for the device object (such device objects may also be referred to as "file system objects" hereinafter) such that, during a boot process, each hypervisor 113 in each node 111 may discover a/vs an/root node for a conceptual global namespace that is exposed by VSAN module 114. By accessing APIs exposed by VSAN module 114, hypervisor 113 may then determine all the top-level file system objects (or other types of top-level device objects) currently residing in VSAN 115.

When a VM (or other client) attempts to access one of the file system objects, hypervisor 113 may then dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through VSAN 115 may, for example, be implemented to emulate the semantics of a particular file system, such as a distributed (or clustered) virtual machine file system (VMFS) provided by VMware Inc. VMFS is designed to provide concurrency control among simultaneously accessing VMs. Because VSAN 115 supports multiple file system objects, it is able to provide storage resources through object store 116 without being confined by limitations of any particular clustered file system. For example, many clustered file systems may only scale to support a certain amount of nodes 111. By providing multiple top-level file system object support, VSAN 115 may overcome the scalability limitations of such clustered file systems.

As described in further detail in the context of FIG. 2 below, a file system object may, itself, provide access to a number of virtual disk descriptor files accessible by VMs 112 running in cluster 110. These virtual disk descriptor files may contain references to virtual disk "objects" that contain the actual data for the virtual disk and are separately backed by object store 116. A virtual disk object may itself be a hierarchical, "composite" object that is further composed of "component" objects (again separately backed by object store 116) that reflect the storage requirements (e.g., capacity, availability, IOPs, etc.) of a corresponding storage profile or policy generated by the administrator when initially creating the virtual disk. Each VSAN module 114 (through a cluster level object management or "CLOM" sub-module, in embodiments as further described below) may communicate with other VSAN modules 114 of other nodes 111 to create and maintain an in-memory metadata database (e.g., maintained separately but in synchronized fashion in the memory of each node 111) that may contain metadata describing the locations, configurations, policies and relationships among the various objects stored in object store 116.

This in-memory metadata database is utilized by a VSAN module 114 on a node 111, for example, when a user (e.g., an administrator) first creates a virtual disk for a VM as well as when the VM is running and performing I/O operations (e.g., read or write) on the virtual disk. As further discussed below in the context of FIG. 3, VSAN module 114 (through a distributed object manager or "DOM" sub-module, in one embodiment as further described below) may traverse a hierarchy of objects using the metadata in the in-memory database in order to properly route an I/O operation request to the node (or nodes) that houses (house) the actual physical local storage that backs the portion of the virtual disk that is subject to the I/O operation.

In some embodiments, one or more nodes 111 of node cluster 110 may be located at a geographical site that is distinct from the geographical site where the rest of nodes 111 are located. For example, some nodes 111 of node cluster 110 may be located at building A while other nodes may be located at building B. In another example, the geographical sites may be more remote such that one geographical site is located in one city or country and the other geographical site is located in another city or country. In such embodiments, any communications (e.g., I/O operations) between the DOM sub-module of a node at one geographical site and the DOM sub-module of a node at the other remote geographical site may be performed through a network, such as a wide area network ("WAN").

Figure 2:
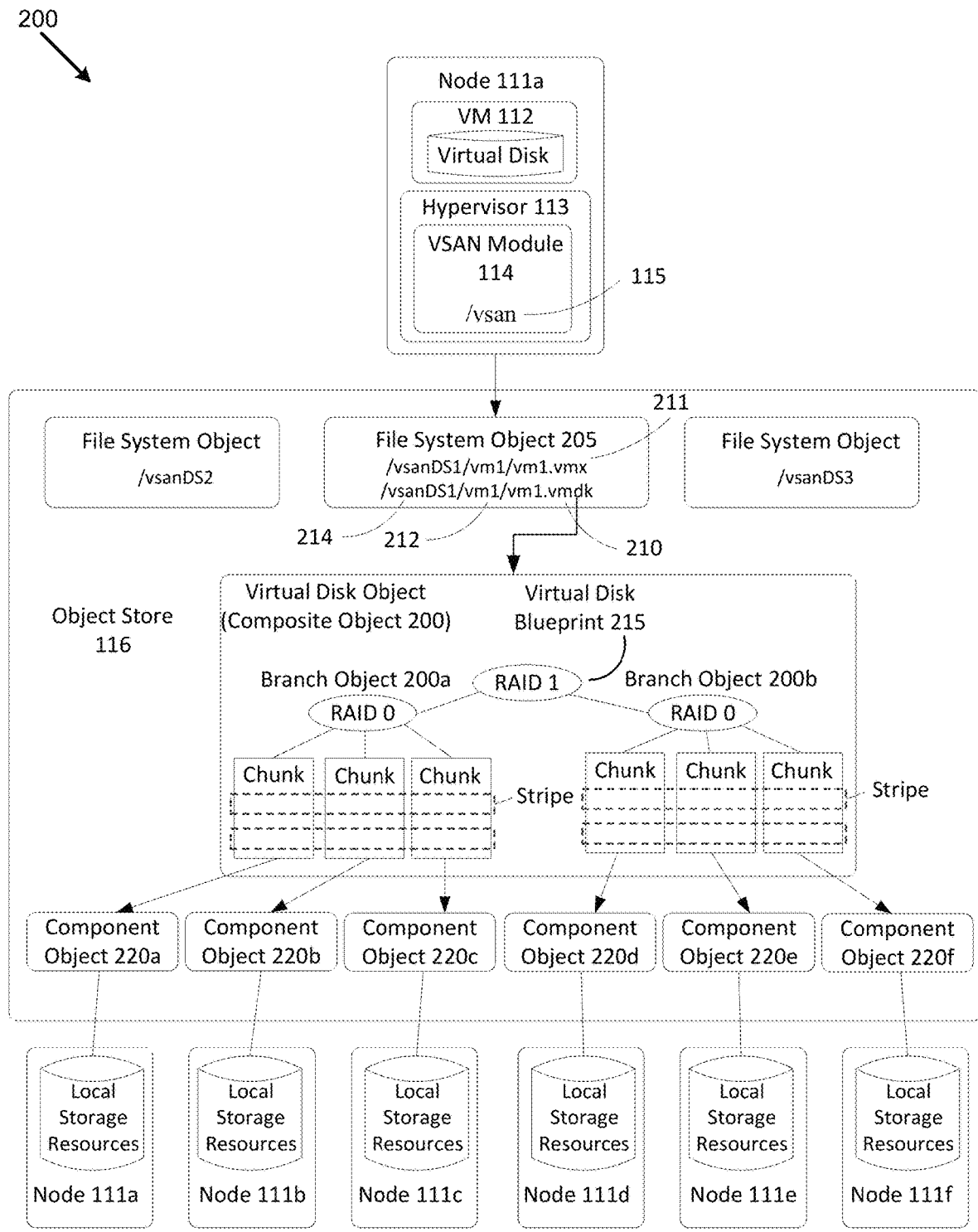
FIG. 2 is a diagram illustrating an example hierarchical structure of objects organized within an object store that represent a virtual disk, according to an example embodiment of the present application.

FIG. 2 is a diagram 200 illustrating an example hierarchical structure of objects organized within an object store 116 that represent a virtual disk, according to an example embodiment of the present application. As previously discussed above, a VM 112 running on one of nodes 111 may perform I/O operations on a virtual disk that is stored as a hierarchical composite object 200 in object store 116. Hypervisor 113 may provide VM 112 access to the virtual disk by interfacing with the abstraction of VSAN 115 through VSAN module 114 (e.g., by auto-mounting the top-level file system object 214 corresponding to the virtual disk object 200). For example, VSAN module 114, by querying its local copy of the in-memory metadata database, may be able to identify a particular file system object 205 (e.g., a VMFS file system object in one embodiment, etc.) stored in VSAN 115 that may store a descriptor file 210 for the virtual disk.

As will be described in more detail below with reference to FIGS. 4 and 5, the mounted datastore 214 may include several namespace objects corresponding to different VMs of datastore 214. Each of these namespace objects may be mapped to a top-level subfolder under the datastore's folder in some embodiments. In the illustrated example of FIG. 2, datastore 214 includes a top-level subfolder (or first-level namespace object) 212 that corresponds to VM 112. In some embodiments, each top-level subfolder may include one or more files that contain information related to the subfolder's VM. In the example of FIG. 2, subfolder 212 may include several different files, such as configuration file 211 (e.g., containing configuration data for VM 112), descriptor file 210 (containing VM 112's virtual disk file, or a pointer to the virtual disk file), a log file (not shown), a snapshot file (not shown), etc. In certain embodiments, each file system object (e.g., file system object 205) may be configured to support only those virtual disks corresponding to a particular VM (e.g., a "per-VM" file system object).

Descriptor file 210 may include a reference to composite object 200 that is separately stored in object store 116 and conceptually represents the virtual disk (and thus may also be sometimes referenced herein as a virtual disk object). Composite object 200 may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g.,) an administrator when creating the virtual disk.

Depending on the desired level of fault tolerance or performance efficiency, a virtual disk blueprint 215 may direct data corresponding to composite object 200 to be stored in the datastore in a variety of ways. FIG. 2 shows composite object 200 that includes a virtual disk blueprint 215 describing a RAID 1 configuration where two mirrored copies of the virtual disk (e.g., mirrors) are each further striped in a RAID 0 configuration. Data striping refers to segmenting logically sequential data, such as a virtual disk. Each stripe may contain a plurality of data blocks (e.g., DB1, DB2, DB3 in stripe 1 of composite object 200). In some cases, as illustrated in FIG. 4, each stripe may also include one or more code blocks (e.g., RAID 5). As shown, the stripes are then split vertically into different groups of blocks, referred to as chunks, where each chunk is logically represented as a "leaf" or "component" object to which composite object 200 contains a reference.

The metadata accessible by VSAN module 114 in the in-memory metadata database for each component object 220 provides a mapping to or otherwise identifies a particular node 111 in cluster 110 that houses the physical storage resources (e.g., magnetic disks 118, etc.) that actually store the chunk (as well as the location of the chunk within such physical resource).

Figure 3:
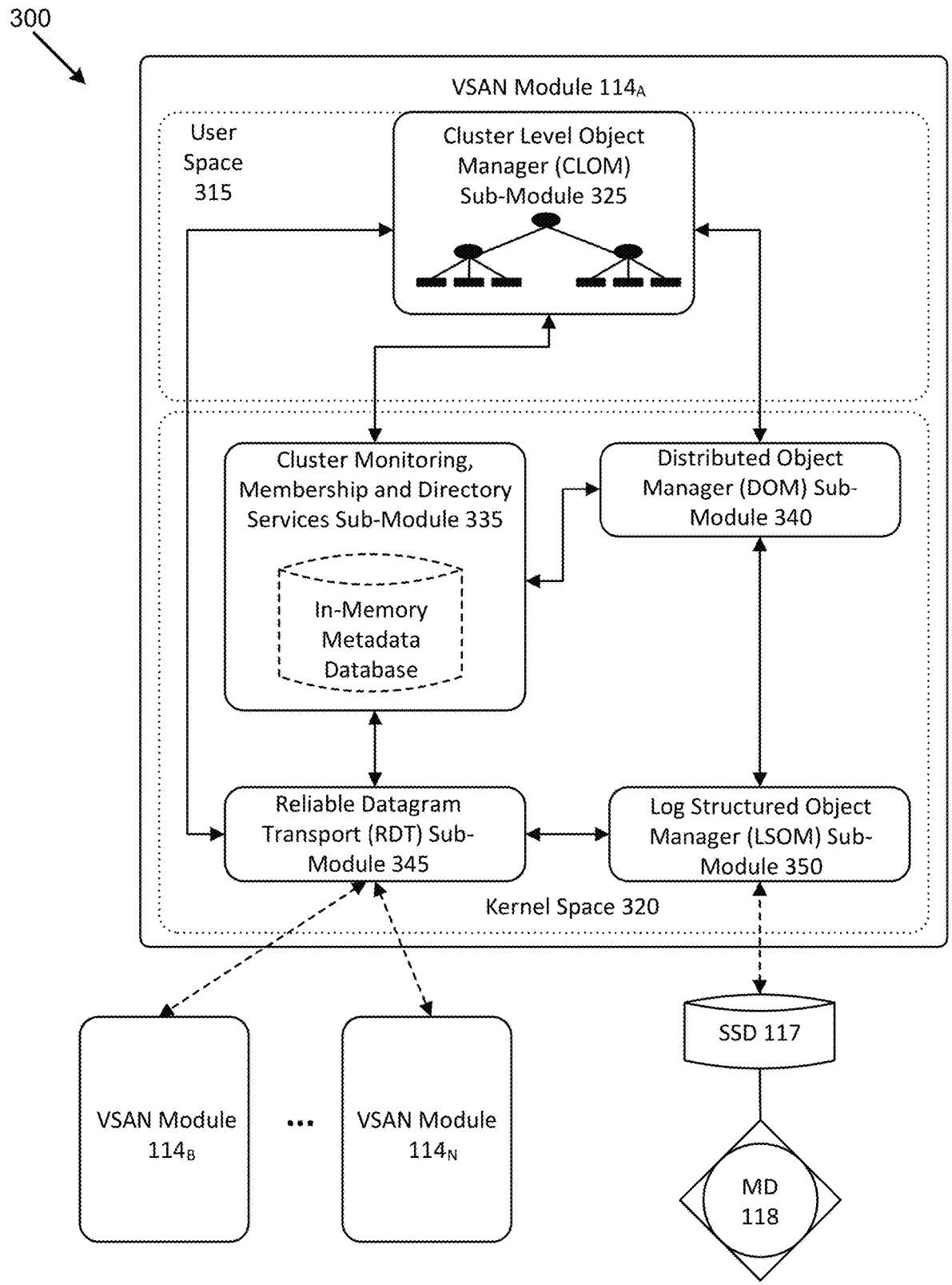
FIG. 3 is a diagram illustrating different components of a VSAN module, according to an example embodiment of the present application.

FIG. 3 is a diagram 300 illustrating different components of a VSAN module, according to an example embodiment of the present application. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object manager (CLOM) sub-module 325 that operates in user space 315. CLOM sub-module 325 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by a user to the storage profile or policy relating to an object or when changes to the cluster or workload result in an object being out of compliance with a current storage profile or policy.

In one embodiment, if a user creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/chunks of the virtual disk to achieve load balancing, etc.). For example, CLOM sub-module 325, in one embodiment, may be responsible for generating blueprint 215 describing the RAID 1/RAID 0 configuration for virtual disk object 200 in FIG. 2 when the virtual disk was first created by the user. As previously discussed, a storage policy may specify requirements for capacity, IOPS, availability, and reliability. Storage policies may also specify a workload characterization (e.g., random or sequential access, I/O request size, cache size, expected cache hit ration, etc.).

Additionally, the user may also specify an affinity to VSAN module 114 to preferentially use certain nodes 111 (or the local disks housed therein). For example, when provisioning a new virtual disk for a VM, a user may generate a storage policy or profile for the virtual disk specifying that the virtual disk have a reserve capacity of 400 GB, a reservation of 150 read IOPS, a reservation of 300 write TOPS, and a desired availability of 99.99%. Upon receipt of the generated storage policy, CLOM sub-module 325 may consult the in-memory metadata database maintained by its VSAN module 114 to determine the current state of cluster 110 in order to generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object store 116 to implement the blueprint by, for example, allocating or otherwise mapping component objects (e.g., chunks) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database may serve as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and their corresponding storage resources, network paths among the nodes 111, and the like.

As previously discussed, in addition to maintaining a physical inventory, the in-memory metadata database may further provide a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations.

For example, as previously discussed, during virtual disk creation, CLOM sub-module 325 may access the in-memory metadata database to generate a virtual disk blueprint, and in order to handle an I/O operation from a running VM 112, DOM sub-module 340 may access the in-memory metadata database to determine the nodes 111 that store the component objects (e.g., chunks) of a corresponding composite object (e.g., virtual disk object) and the paths by which those nodes are reachable in order to satisfy the I/O operation. In some embodiments, as will be described in more detail below, some or all of the metadata catalog (e.g., the mapping of the object to physical storage locations, etc.) may be stored with the virtual disk object 200 in the object store 116. This way, another layer of security may be added for accessing the objects.

As previously discussed, DOM sub-module 340, during the handling of I/O operations as well as during object creation, may control access to, and may handle operations on, those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network (e.g., local area network (LAN), or WAN) with a different DOM sub-module 340 in a second node 111 (or nodes) that serves as the coordinator for the particular component object (e.g., chunk, etc.) of the virtual disk object that is stored in the local storage of the second node 111 (or nodes) and which is the portion of the virtual disk that is subject to the I/O operation.

If the VM issuing the I/O operation resides on a node 111 that is also different from the coordinator of the virtual disk object, the DOM sub-module 340 of the node running the VM may also have to communicate across the network (e.g., LAN or WAN) with the DOM sub-module 340 of the coordinator. In certain embodiments, if the VM issuing the I/O operation resides on a node that is different from the coordinator of the virtual disk object subject to the I/O operation, the two DOM sub-modules 340 of the two nodes may communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 may also similarly communicate amongst one another during object creation (and/or modification). For example, a virtual disk blueprint generated by CLOM module 325 during creation of a virtual disk may include information that designate which nodes 111 should serve as the coordinators for the virtual disk object, as well as its corresponding component objects. The DOM sub-modules 340 for such designated nodes may be issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 may interact with a log structured object manager (LSOM) sub-module 350 that serves as the component in VSAN module 114 that may actually drive communication with the local SSDs and magnetic disks of its node 111. In addition to allocating local storage for component objects (as well as storing other metadata, such as policies and configurations for composite objects for which its node serves as coordinator, etc.), LSOM sub-module 350 may additionally monitor the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 may be used, for example, when DOM sub-modules 340 communicate with one another, as previously discussed above, to create objects or to handle I/O operations. In certain embodiments, RDT module 345 may interact with CMMDS module 335 to resolve the address of logical endpoints dynamically in order to maintain up-to-date location information in the in-memory metadata database, as well as to create, remove, or reestablish connections based on link health status. For example, if CMMDS module 335 reports a link as unhealthy, RDT sub-module 345 may drop the connection in favor of a link in better condition.

In some cases, one or more nodes 111 within node cluster 110 may fail or go offline, resulting in a loss of the data and/or code blocks stored by such nodes. In such cases, the distributed storage system or VSAN environment 100 may have to be able to tolerate such a failure and efficiently reconstruct the missing data blocks. In some other cases, a node 111 may go offline temporarily and then come back online resulting in some out-of-sync data blocks. To address such cases, the distributed storage system may be configured with fault tolerance technologies to resync such out-of-sync data and/or code blocks. Accordingly, to increase performance efficiency and fault tolerance, distributed storage systems (e.g., VSAN environment 100) may implement a variety of fault tolerance technologies, such as the various levels of RAID and/or erasure coding, etc. As described above in relation to FIG. 2, depending on the required level of performance and fault tolerance, virtual disk blueprint 215 may direct composite object 200 to be distributed in one of several ways. In some embodiments, one or a combination of RAID levels (e.g. RAID 0 to RAID 6) may be used, where each RAID level or a combination thereof may provide a different level of fault tolerance and performance enhancement.

Referring back to FIG. 2, for example, FIG. 2 illustrates an example of the application of RAID 1, which entails creating a replica of composite object 200. This is to ensure that a second copy (e.g., branch object 200*b*) of composite object 200 is still available if a first copy (e.g., branch object 200*a*) is lost due to some sort of failure (e.g. disk failure etc.).

In addition to RAID 1, FIG. 2 also illustrates the application of RAID 0 to the two copies of composite object 200 (branch object 200*a* and branch object 200*b*, created as a result of RAID 1). Under RAID 0, each copy of composite object 200 may be partitioned into smaller data stripes, where each stripe is further segmented into a number of data blocks (e.g., DB1, DB2, DB3, in the first stripe, and DB4, DB5, DB6, in the second stripe) and distributed across local storage resources of various nodes in the datastore. In some cases, striping a copy of composite object 200 over local storage resources of various nodes may enhance performance as compared to storing the entire copy of composite object 200 in a single node. This is because striping the data means that smaller amounts of data are written to or read from local storage resources of multiple nodes in parallel, thereby reducing the amount of time to complete a particular read or write operation. However, multiplying the number of nodes used to store the various chunks of data may increase the probability of failure, and thus data loss.

As discussed above, a common object-based datastore, such as VSAN, may not conventionally have a fine grained security control over object access. For example, in order for a VSAN object-based datastore to be presented in a file system format, the object storage file system (OSFS) may provide a portable operating system interface (POSIX) compliant file system interface for the VSAN datastore. Such OSFS architecture may mandate that each file system is identified by a provider identification (PID), container ID (CID) tuple in the PID: CID format. All file systems that belong to an OSFS backend provider may share the same PID (e.g., "vsan" for a VSAN datastore). The CID, in some embodiments, may include a universally unique ID (UUID) having a particular format (e.g., "nnnnnnnnnnnnnnnn-nnnnnnnnnnnnnnnn").

Figure 4:
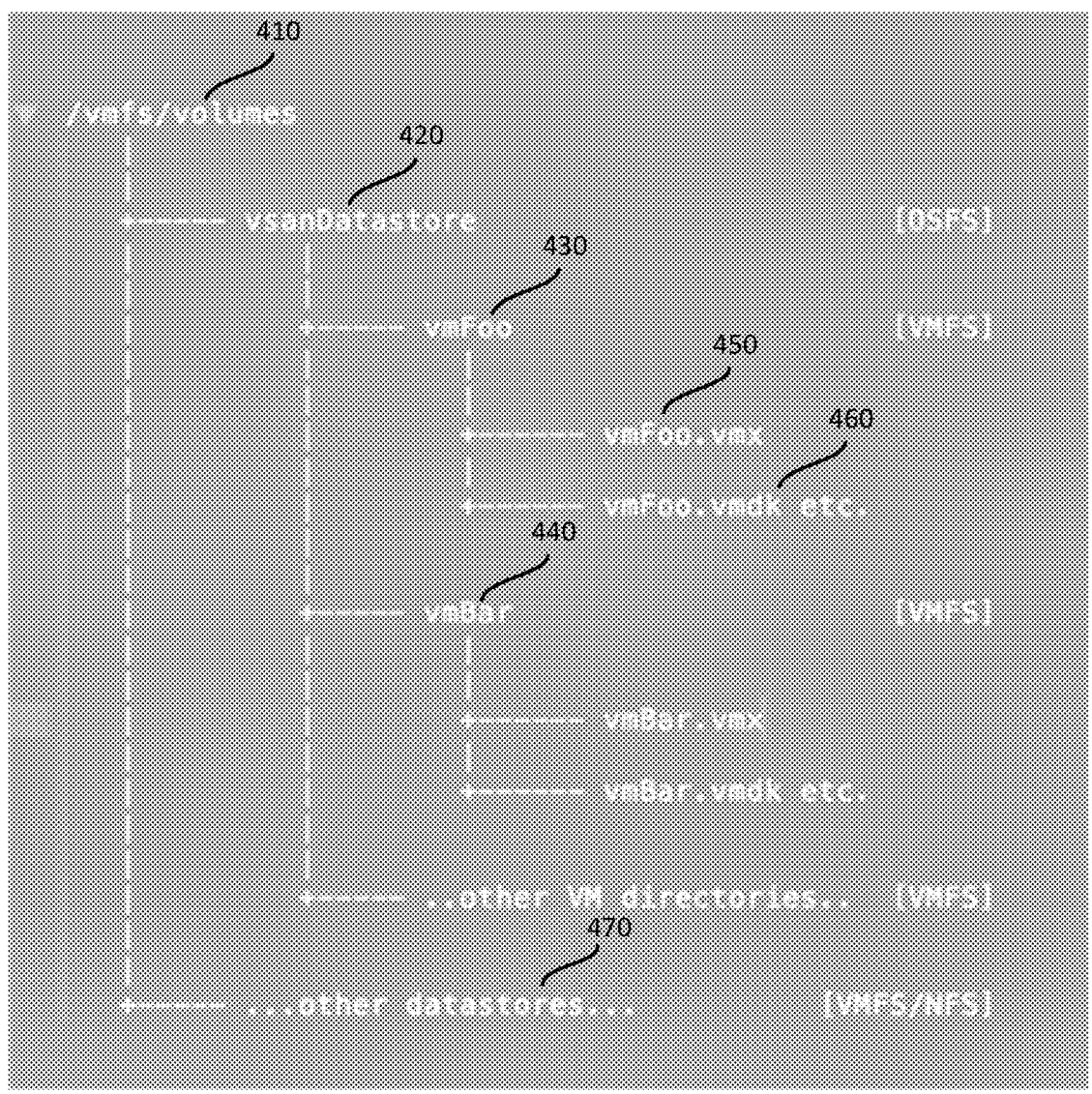
FIG. 4 is a diagram illustrating an example VSAN datastore mounted by an object storage file system (OSFS), according to an example embodiment of the present disclosure.

FIG. 4 is a diagram 400 illustrating an example VSAN datastore mounted by an object storage file system (OSFS), according to an example embodiment of the present disclosure. The OSFS, in some embodiments, may mount the VSAN datastore under a virtual machine file system (VMFS) format. In some embodiments, the VSAN datastore may be mounted under a particular path similar to many other types of datastores. In some embodiments, within a datastore (e.g., a default VSAN datastore), one or more namespace objects may be created by a user (e.g., an administrator, a client, etc.). The namespace objects, in some embodiments, may be formatted with a file system (e.g., the VMFS) that may hold plain files for use by upper layer applications. In some embodiments, the OSFS may map the namespace objects as top-level subfolders in the datastore container. The files within these subfolders may include references to other types of objects (e.g., via the objects' UUIDs), such as storage objects (e.g., virtual disks).

In FIG. 4, as shown, a default VSAN datastore vsanDatastore 420 is mounted (e.g., by OSFS) under the path "/vmfs/volumes" 410. For example, a user may have created vsanDatastore 420 and set up several namespace objects under the datastore including namespace object vmFoo 430 and namespace object vmBar 440. Each of the namespace objects 430 and 440 may have been created for a different virtual machine (VM) in this example. As can be seen in the figure, the namespace objects 430 and 440 may act as top-level (or first-level) subfolders in the datastore container vsanDatastore 420. In some embodiments, each top-level subfolder may include one or more files that contain different information about the objects (e.g., VMs) associated with the subfolder.

In the example illustrated in FIG. 4, subfolder (or namespace object) 430 may include several files, such as vmFoo.vmx 450 and vmFoo.vmdk 460. In some embodiments, a configuration file (e.g., vmFoo.vmx file 450) under a namespace object (e.g., VM 430) may contain settings/configuration information (e.g., disk size, networking and operating system information, etc.) about the object(s) associated with the namespace object. A user may choose (e.g., through a user interface application) the settings/configuration for the virtual machine (e.g., VM 430) when the user creates the virtual machine. A descriptor file, such as "vmFoo.vmdk" file 460 may contain the contents, or a pointer to the contents, of the object (e.g., the virtual machine's virtual disk). In some embodiments, the descriptor file may reference a database/storage object (e.g., a VM's virtual disk) through the object's unique identifier.

As described above, datastore vsanDatastore 420 may be assigned a unique ID tuple in the format of PID:CID. The provider ID in vsanDatastore 420's unique ID may be shared by other datastores 470 that have a common provider (e.g., VMware) and are mounted under the same path "/vmfs/volumes" 410. The container ID in vsanDatastore 420's unique ID, however, is a unique ID that is assigned to only vsanDatastore 420 and may not be shared with other datastores among other datastores 470 (even the datastores that share a common provider as vsanDatastore 420). Additionally, as described above, the virtual disk object referenced in the virtual disk descriptor file vmFoo.vmdk 460 may be assigned a QUID, through which the object may be accessed in some embodiments.

In some embodiments, when the datastore system is initialized, a default datastore may be created on top of the underlying storage pool and mounted as the first container under a specific provider. For example, in the VSAN case, a default vsanDatastore container may be mounted when the VSAN system is setup. A user may create one or more virtual machines under the default datastore. In some embodiments, all of the VMs associated with a datastore, such as the default vsanDatastore, may be assigned the same security level and access permissions for accessing the objects associated with the datastore. That is, in the illustrated example of FIG. 2, vmFoo 430, vmBar 440, and all the other namespace objects (or VMs) may be assigned the same access permissions (that is assigned to the default vsanDatastore 420). As such, no separate permission privileges can be required at the object level.

In some embodiments, instead of a single default datastore for a single underlying storage pool, two or more datastores (e.g., logical datastores) may be created that share the same underlying storage pool. Each logical datastore, however, is a different datastore entity that may be assigned a unique CID and a unique set of access permissions for different users, or group of users.

For example, when a user creates several VMs, a first logical datastore may be created that may include a first group of the VMs, and a second logical datastore may be created that may include a second group of the VMs. In some embodiments, the first logical datastore may be the conventional default datastore. Each of these two logical datastores may be assigned a different CID and a different set of access permissions for the users that can access the VMs in each logical datastore. For example, the first group of VMs may be only readable (so that the client users cannot make a change to those VMs) and the second group of VMs may be both readable and writeable. As such, the authorized users that have access to the VMs of the first group may only perform read operations on these VMs, while the users that have access to the VMs of the second group may perform both read and write operations on the VMs of the second group. In some embodiments, the logical datastores may be mounted like any other datastore (e.g., the default datastore) in the file system hierarchy.

Figure 5:
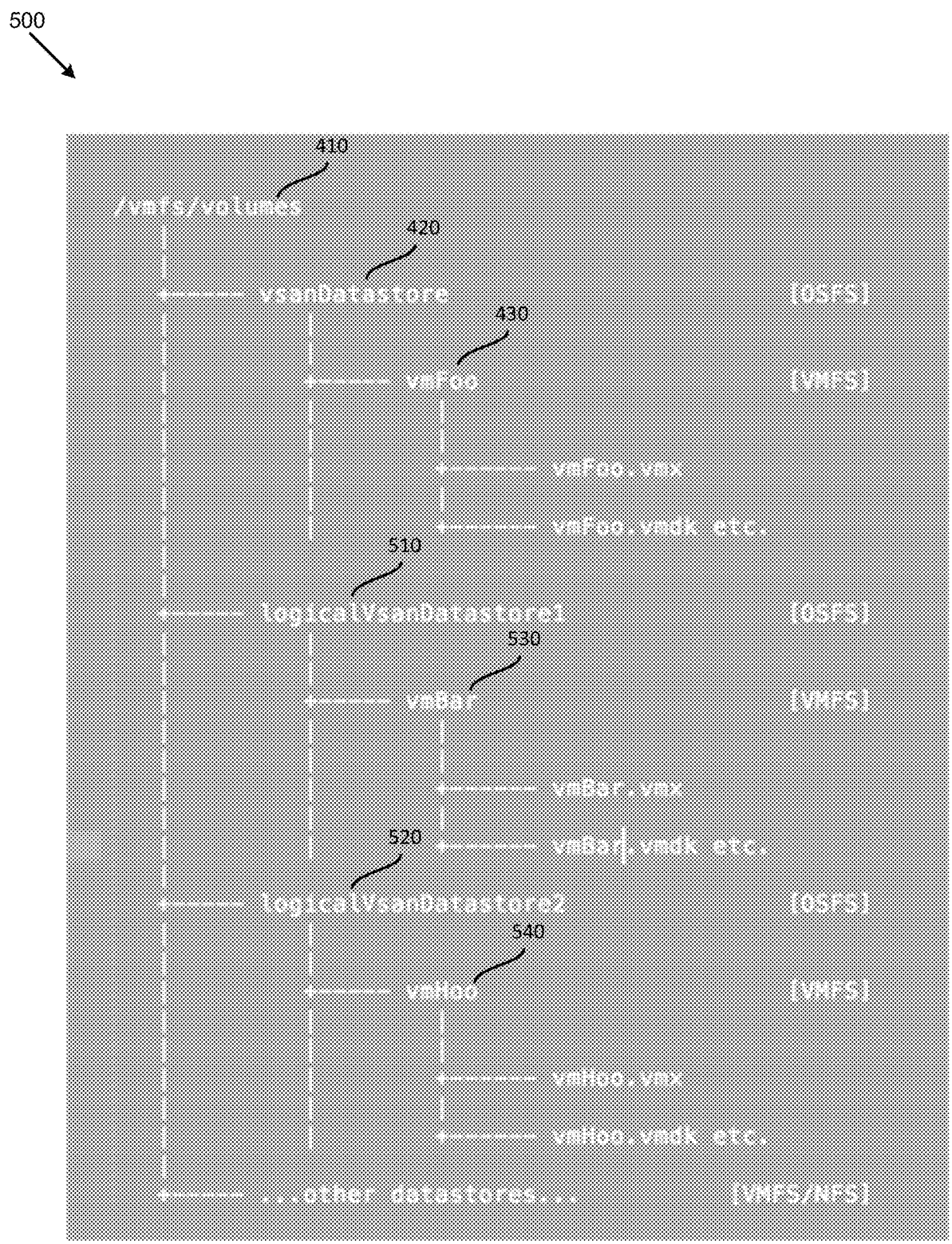
FIG. 5 is a diagram 500 illustrating an example of generating multiple VSAN logical datastores having different access permissions, and mounting the logical datastores by the OSFS, according to an example embodiment of the present disclosure.

FIG. 5 is a diagram 500 illustrating an example of generating multiple VSAN logical datastores having different access permissions, and mounting the logical datastores by the OSFS, according to an example embodiment of the present disclosure. As shown in FIG. 5, several logical datastores, such as vmFoo 430, vmBar 530, and vmHoo 540 are created (e.g., by a process such as process 600, as described below). These different logical datastores may include different sets of one or more security criteria. In some embodiments, namespace objects (e.g., VMs) may be categorized into different groups depending on a set of one or more security criteria assigned to each group.

Each group of namespace objects may then be included in the logical datastore associated with the corresponding set of one or more security criteria assigned to the group. The security criteria defined for different groups may be defined by the user creating the namespace objects in some embodiments, while in other embodiments, the security criteria may be defined by an administrator. In yet, some other embodiments, the security criteria may be preconfigured. In some embodiments, some of the criteria may be defined by a user (e.g., a client, or an administrator), and some other criteria may be preconfigured.

In the illustrated example of FIG. 5, the method may create three separate logical datastores including vsanDatastore 420, LogicalVsanDatastore1 510, and LogicalVsanDatastore2 520 for each of the namespace objects vmFoo 430, vmBar 530, and vmHoo 540, respectively. This way, the storage objects associated with each of these namespace objects may be assigned a different set of access privileges. That is, all objects that are grouped into one datastore can be protected by the same privileges assigned to that datastore.

It should be noted that even though in the illustrated example, a logical datastore is created for each one of the namespace objects, in some other examples, more than one namespace object may be associated with a logical datastore based on their shared set of security privileges. For example, vmBar 530 and vmHoo 540 may be grouped together under the logical datastore LogicalVsanDatastore1 510 when both of these namespace objects share the same set of security privileges. Also, as illustrated in FIG. 5, each top-level subfolder for a namespace object, which is under a separate logical datastore, may include one or more files that contain information and/or metadata for the objects associated with that subfolder.

In order to support multiple (logical) datastores, some embodiments may tag the namespace objects in the containers (or datastores) with CIDs of the containers to indicate the objects' datastore affiliation. Additionally, some embodiments may require the OSFS backend, among other things, to be datastore aware. For example, in some embodiment, when listing a datastore, the OSFS may only mount the namespace objects that have the same CID as the container. To do so, some such embodiments may make some slight changes in the POSIX module's application programing interfaces (APIs). Two example embodiments in which the POSIX module's API requests may be modified are described below.

For example, a Readdir request may require all namespace objects in a datastore to be listed. The namespace objects may be presented as directories and symbolic links, for example, in the default datastore (as shown, for example, in FIG. 4). When there is only one physical datastore, the OSFS module may find all namespace objects in the cluster monitoring membership directory service (CMMDS) based on the object type and add their UUID-based, and/or friendly, names to the volume cache. When there are multiple logical datastores (e.g., instead of one default datastore), however, the OSFS module should only return the objects that belong to the container (or datastore) that is targeted by the Readdir operation. Some embodiments may do so by retrieving the CIDs of the namespace objects and comparing them with the CID included in the Readdir request. In some such embodiments, only the namespace objects with a matching CID may be listed.

As another example, a Lookup request may require the file system to mount a specific directory with a given friendly name (or UUID-based name) in the request. After mounting the directory, all the contents in the directory may be accessed. For a single datastore, a lookup request for namespace objects that are kept in the CMMDS is based on a user friendly name (ufn) or UUID-based name of the namespace object. When a single physical storage is represented by multiple logical datastores, however, in some embodiments, the API request may be slightly modified since the datastore name follows the format of PID:CID tuple (e.g., the PID being the provider ID and CID being a container's UUID). That is, in some embodiments, a full pathname, starting with "/vmfs/volumes" at the root of VMFS, followed by the OSFS datastore name, and then the namespace object, may always include the CID of the datastore as well. As such, any name-based file system operation, such as Lookup and Readdir, may have access to the CID at the top level. The CID may then be leveraged throughout the OSFS system to enforce the POSIX semantics across multiple (logical) VSAN datastores.

For example, in the lookup request, for a single default datastore, the mapping of the user friendly name (or UUID-based name) to the namespace object may not be changed. The OSFS may look up the namespace object with the given ufn (or UUID) and then mount the namespace object. For multiple logical datastores, however, the mapping may be changed to a combination of user friendly name and CID (ufn+cid) to namespace object. This way, the OSFS may look up the namespace object with the combination of CID and a given ufn (or UUID), and then mount the namespace object.

From the perspective of a virtualization platform or infrastructure, such as vSphere (provided by VMware), a logical VSAN datastore is not any different from other types of datastores. For example, all of the existing virtualization workflows (e.g., vSphere workflows) including, but not limited to, storage policy based management (SPBM), VM operations, migration (e.g., vMotion and svMotion), replication, and backup, may be applicable to a logical datastore the same way they are applicable to the default datastore. The logical datastore, in some embodiments, may be created to provide a seamless way for fine grained permissions management by leveraging a datastore abstraction in some embodiments.

As described above, one or more logical datastores that are created for different namespace objects of a datastore may share the same underlying storage pool. As such, some embodiments may only calculate the capacity of one logical datastore (e.g., the default datastore) when calculating the total capacity for a list of logical datastores. In particular, each logical datastore is associated with the same underlying physical storage pool, so calculating the capacity of any individual logical datastore would normally return the capacity of the entire underlying physical storage pool. Therefore, if the capacity for the list of logical datastores were calculated by summing the capacity of each logical datastore of the list, the capacity returned would be greater than the actual capacity of the entire underlying physical storage pool, in particular multiplied by the number of logical datastores in the list. Thus, some embodiments may distinguish the one logical datastore, such as the default datastore, from the other logical datastores, by adding an attribute (e.g., aliasOf) to the datastores' attributes list. Some such embodiments may set the value of this attribute (i.e., aliasOf) for the default datastore to "null".

Further, the value of the aliasOf variable for the rest of the logical datastores may be set to the CID of the default datastore. As such, when the aliasOf variable's value is not "null", it means that the current datastore is a logical datastore other than the default datastore that shares the same underlying physical storage pool as the default datastore. For example, with reference to FIG. 5, if the CID value of vsanDatastore 420 (e.g., the default datastore) is 50d8cf5c-c4c3-cd6f-840e-0cc47af2d746 and the aliasOf of this datastore is set to "null", the CID value of Logicalvsan-Datastore1 510 that is associated with the default datastore may be set to "ab64b05c-c4aa-b5e3-a8df-ac1f6b0c1280", while the aliasOf value of this logical datastore may be set to "50d8cf5c-c4c3-cd6f-840e-0cc47af2d746" (i.e., the same CID as the default datastore's CID). Similarly, the CID value of LogicalvsanDatastore2 520 that is associated with the same default datastore 420 may be "4cf554a4-ed40-4b1c-8b99-1a85f70c190a", while the aliasOf value of this logical datastore may be set to "50d8cf5c-c4c3-cd6f-840e-0cc47af2d746" (i.e., the same CID as the default datastore's CID). In some embodiments, when a total capacity of the datastores is calculated, datastores with aliasOf values that are not set to be "null" may be skipped in the calculation.

As described above, each namespace object that is under a particular datastore directory may inherit the same security checks and access permissions that are assigned to the particular datastore. In some embodiments, the namespace object may be tagged with the CID of its parent datastore to be able to determine access permissions for the namespace object. That is, in some embodiments, the CID of a parent datastore may be persisted in the namespace object's metadata in order to determine to which datastore the namespace object belongs. This way, all namespace objects are protected by means of the permission controls assigned to their parent datastore. With multiple datastores having different security access permissions, different users may be able to access the objects of their datastores based on the access permissions assigned to the datastores.

For example, a datastore for a client of a datacenter may be divided into a management datastore and a workload datastore. The administrators of the datacenter may be able to see all of the datastores (e.g., all the VMs that belong to both management and workload datastores), while the users (e.g., the client) may only be able to see the workload datastore (e.g., only the VMs that belong to the workload datastore). As a result, the users may not be able to even see the management datastore, much less creating, modifying, or even list the directories in the management datastore. When listing a datastore for which access permission is granted, in some embodiments, the OSFS module may only list the namespace objects that include (or are tagged with) the same CID as the datastore.

Figure 6:
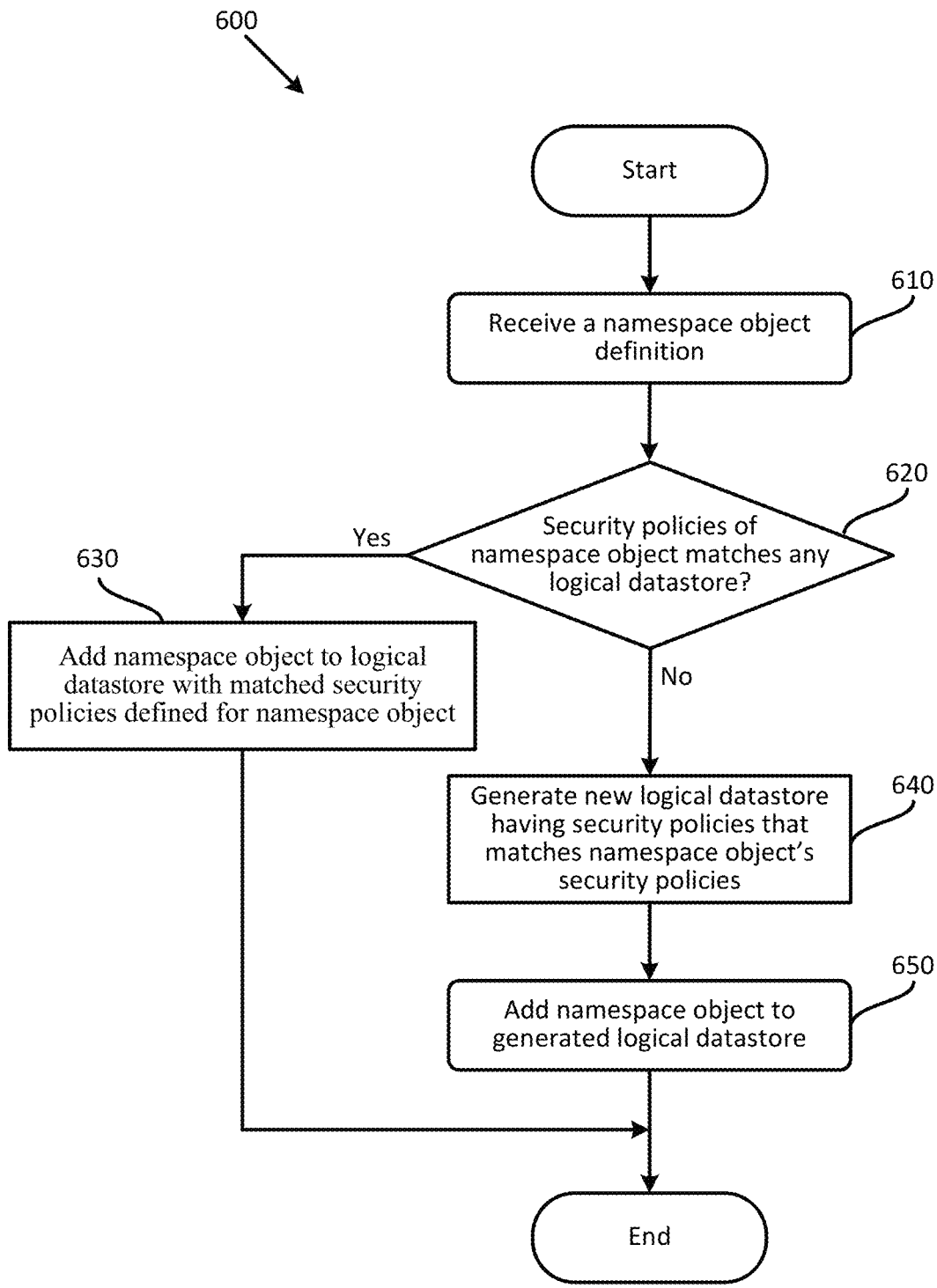
FIG. 6 is a flowchart illustrating a method (or process) for assigning security privileges to the namespace objects based on security privileges that are assigned to different datastores, according to an example embodiment of the present application.

FIG. 6 is a flowchart illustrating a method (or process) 600 for assigning security privileges to the namespace objects based on security privileges that are assigned to different datastores, according to an example embodiment of the present application. The method 600 may be performed by a module such as VSAN module 114, as described in FIGS. 1-3 in some embodiments. In some other embodiments, the method may be performed by some other modules that reside in the hypervisor or outside of the hypervisor. In some embodiments, the method 600 may be performed when a user (e.g., an administrator, or a client) defines (or creates) a name space object to be added to a datastore.

Process 600 may start, at action 610, by receiving a namespace object definition. For example, after a user creates or sets up a datastore, such as the VSAN default datastore, the process may receive the data that indicates the attributes of namespace object that may include the security policies associated with the namespace object. In some embodiments, if the user does not define any security policies for the namespace object, it may be added to the default datastore. In some such embodiments, after the namespace object is added to the default datastore, the namespace object may be assigned the security policies that are associated with the default datastore. In some embodiments, these security policies may be predefined, or may be defined/modified by a user.

Process 600 may then determine, at 620, whether any (logical) datastore has been previously created that covers the security policies defined for the namespace object. For example, the namespace object definition may include security policies that match the default datastore or any other (logical) datastore that has been previously created. When process 600 determines that a logical datastore with matching security policies defined for the namespace object exists, the process may add, at 630, the namespace object to the logical datastore that covers (or matches) the security policies defined for the namespace object.

On the other hand, when process 600 determines that no logical datastore with matching security policies defined for the namespace object exists, the process may create/generate, at 640, a new logical datastore and assign at least the security policies that are defined for the namespace object to the newly generated logical datastore. The process may mount the new logical datastore under the same path that the default datastore is mounted in some embodiments. The logical datastore may be mounted (e.g., by an OSFS submodule of process 600) and formatted with a specific file system (e.g., VMFS) similar to the default datastore.

After generating a new logical datastore, process 600 may add, at 650, the namespace object to the newly generated logical datastore with matching security policies that are defined for the namespace object. Process 600 may additionally perform other procedures (e.g., described above) that are not shown in FIG. 6. For example, process 600 may also assign a CID to each logical datastore which is different from the CIDs of the other logical datastores. Process 600 may tag the namespace object(s) under each logical datastore with the same CID that is assigned to the associated logical datastore (e.g., the same CID may be persisted in the namespace object's metadata). Process 600 may also add an attribute to each generated logical datastore which may include the CID of the default datastore. This way, as described above, when calculating the storage size, the logical datastores' sizes may be skipped (e.g., because in reality they don't occupy any additional physical storage and share the physical storage with the default datastore). Process 600 may then end.

As described above, in some embodiments, each namespace object may be mapped to a top-level subfolder that includes the files associated with the namespace object. The namespace objects (e.g., VMs) and their related objects (e.g., storage objects) may share the same access permissions (read, write, read/write) as the logical datastore with which they are associated (or to which the namespace objects are added). As described above, the logical datastores (including the default datastore) may share the same underlying physical storage pool.

Assigning different security permissions to different namespace objects makes it possible for the users to have different types of access to the objects that belong to different namespace objects. For example, a first object (e.g., a first virtual disk) associated with a first namespace object (e.g., a first VM) may be accessed by a user with a read only permission (e.g., the user may only read from the virtual disk), while the same user may access a second object (e.g., a second virtual disk) associated with a second namespace object (e.g., a second VM) with a read/write permission (e.g., the user may both read from and write to the virtual disk).

Similar to the namespace objects (e.g., VMs), non-namespace objects, such as storage objects (e.g., virtual disks), may also be tagged with the datastores' CIDs to enhance the access security for these objects in some embodiments. This is in addition to a UUID that is assigned to each object for accessing the object. That is, each object, in some embodiments, may be associated with a descriptor file (e.g., descriptor file 460, with reference to FIG. 4) in the datastore. For example, a VMDK descriptor file may point to an object through the object's UUID (e.g., in VSAN the descriptor file may include the path to the object, such as "vsan://uuid").

In order to modify the descriptor file, the user should have a corresponding permission on the datastore that includes the descriptor file. This way the object may be accessed by an authorized user that has proper access privileges. If the object's UUID, however, gets leaked due to various circumstances (e.g., a user gets access to a log file of the object which includes the UUID for the object), an unauthorized user (e.g., a hacker) may be able to read, write, or even destroy objects for which the unauthorized user has no permission to access. For example, by tampering with a VMDK descriptor file, an unauthorized user may make the descriptor file to point to an object in another datastore for which the user has no permission to access.

Figure 7:
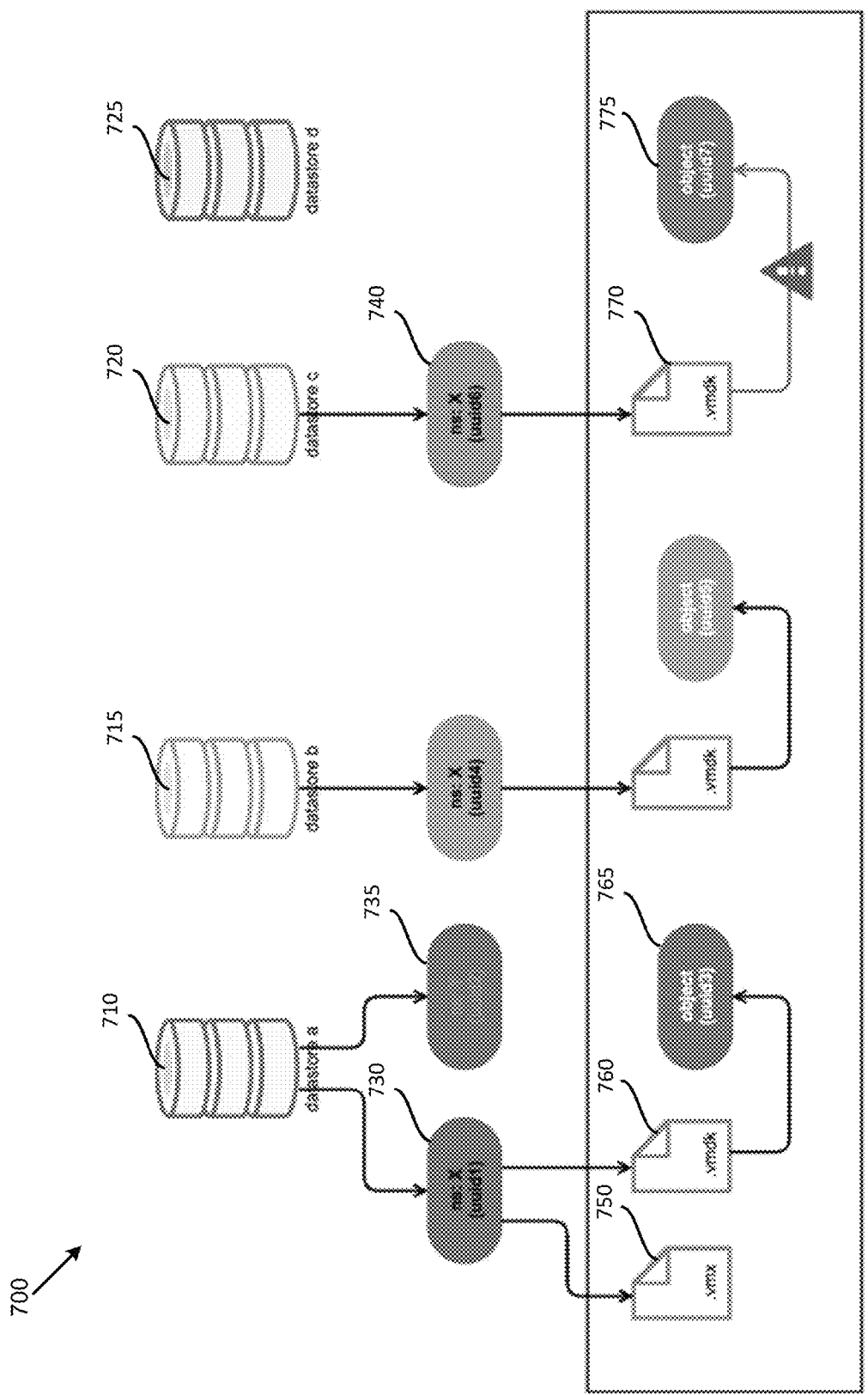
FIG. 7 is a diagram 700 illustrating a tampered descriptor file pointing to an object that is not authorized to be accessed, according to example embodiments of the present application.

FIG. 7 is a diagram 700 illustrating a tampered descriptor file pointing to an object that is not authorized to be accessed, according to example embodiments of the present application. The figure includes four datastores 710, 715, 720, and 725. Each datastore may be a (logical) datastore (e.g., an object-based VSAN datastore) created for a group of users (e.g., for a client's organization). Each datastore may have been created by a process, such as process 600, with reference to FIG. 6. The users of each datastore may not be authorized to access the objects associated with the other datastores.

As can be seen in FIG. 7, datastore 710 may include several namespace objects including the two namespace objects 730 and 735 (e.g., two different VMs). Each namespace object may be assigned a UUID, and may also be tagged with the CID of datastore 710, as described above. FIG. 7 also illustrates that namespace object 730 may include several files, such as configuration file 750 and descriptor file 760. These files, as described above, may include various information for objects associated with the datastore 710. For example, descriptor file 760 may include a pointer (e.g., an address path) to object 765 (e.g., a virtual disk of a VM stored on one or more physical disks).

Similarly, FIG. 7 shows that datastore 720 may include several namespace objects, such as namespace object 740. Namespace object 740 may be assigned a UUID, and may also be tagged with the CID of datastore 720, as described above. Furthermore, namespace object 740 may include several files, such as descriptor file 770. Descriptor file 770, however, is pointing to an object associated with datastore 725, for which no access is permitted (e.g., by a user that has access to descriptor file 770). This is because the descriptor file 770 associated with namespace object 740 has been tampered with (e.g., by a user of datastore 720, or by a hacker), and now it is pointing to object 775 which is associated with a separate datastore 725.

There are multiple scenarios in which an unauthorized user may be able to tamper with descriptor file 770 to modify it to reference an unauthorized object, such as object 775. In an example scenario, a user may create a VM on a workload layer datastore. The user may then determine the UUID of an administrative layer VM (e.g., by running a query that only needs system read privilege, such as QueryCMMDS API of vsanInternalSystem MO). The user may then create a regular VMDK descriptor file (e.g., using a text file) and change the VSAN UUID to the determined UUID of the administrative layer VM. The user may then upload the created VMDK descriptor file for the workload layer VM, such that the uploaded descriptor file becomes one of the files that is associated with the workload layer VM (e.g., with the namespace object for the VM). At this point, if the user deletes the workload layer VM, effectually, the user has killed the administrative layer VM. Alternatively, the user may change the workload layer VM's policy, and as a result, change the target object's policy (i.e., the administrative layer VM's policy).

In another example scenario, a user may create a VM on a workload layer datastore. The user may then power on the VM and take a snapshot of the VM. Thereafter, the user may determine the UUID of an administrative layer VM (e.g., by running a query that only needs system read privilege, such as QueryCMMDS API of vsanInternalSystem MO). The user may then create a regular VMDK descriptor file (e.g., using a text file) and change the VSAN UUID to the determined UUID of the administrative layer VM. The user may then upload the created VMDK descriptor file for the workload layer VM, such that the uploaded descriptor file becomes one of the files that is associated with the workload layer VM (e.g., with the namespace object for the VM). At this point, if the user deletes the original snapshot file and renames the descriptor file with the original snapshot file's name and then deletes the snapshot, the user has, in effect, killed the administrative layer VM, as the home object for this VM is deleted.

To prevent the above described, or other types of, attacks from happening, some embodiments may disallow object access across different datastores. In some such embodiments, when an object is created, a descriptor path of the object may be stored (e.g., by the VSAN module 114, as described with reference to FIGS. 1-3) as an attribute "objPath" in object's metadata. In some embodiments, the objPath attribute may include the CID of the datastore for which the object is created. As such, at the time of the object creation, the description path (and therefor the objPath attribute) may always point to the datastore with which the object is associated (or in which the object resides). In some embodiments, when a request for accessing the object is received (e.g., by the VSAN module), the CID associated with the descriptor path may be extracted (e.g., by the VSAN module) and compared with the CID of the objPath variable. In some embodiments, if the extracted CID does not match the objPath CID, the VSAN module may disallow access to the object (e.g., because some unauthorized user has tampered with the descriptor file).

Figure 8:
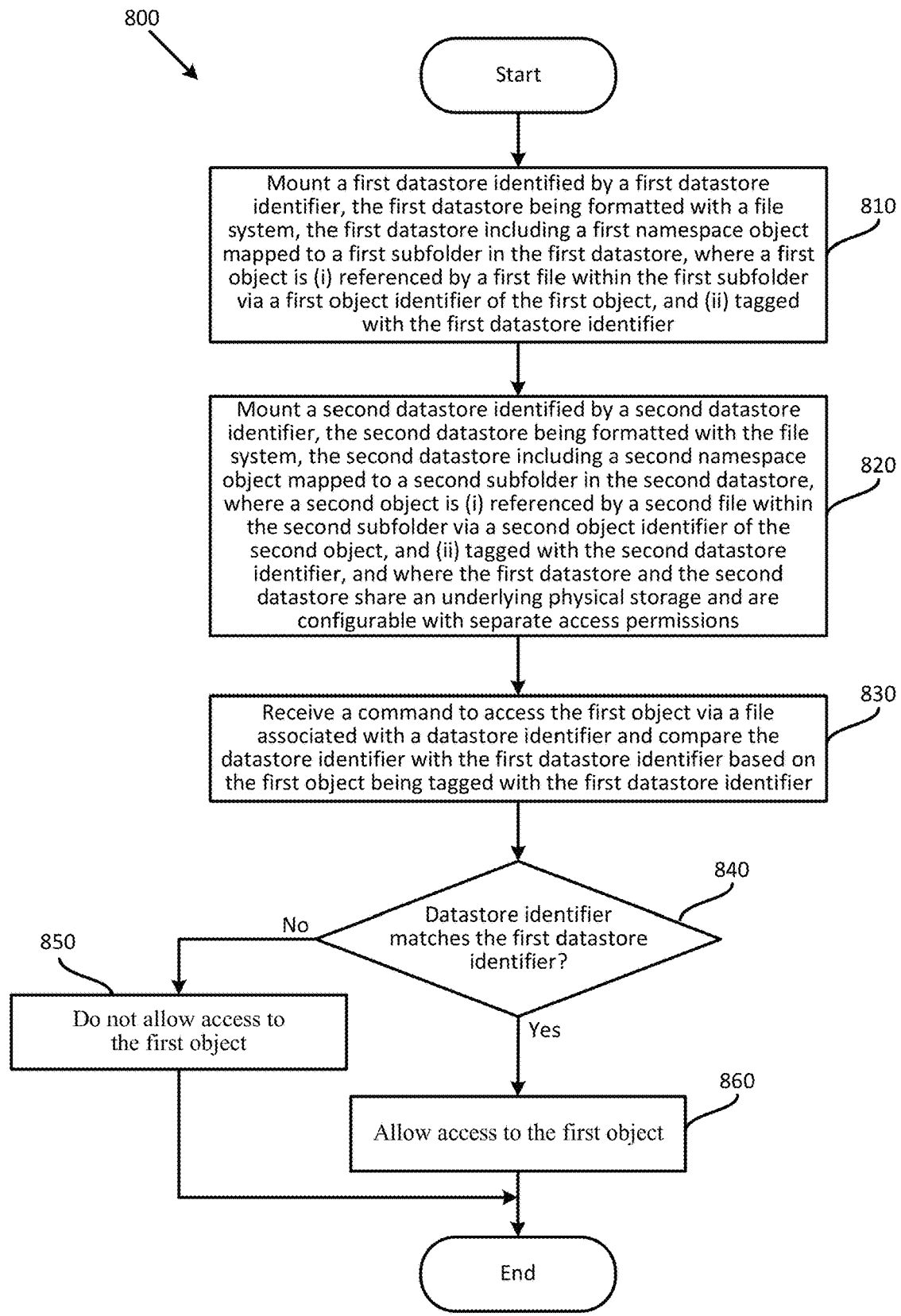
FIG. 8 is a flowchart illustrating a method (or process) for determining authorized access to an object, according to an example embodiment of the present application.

FIG. 8 is a flowchart illustrating a method (or process) 800 for determining authorized access to an object, according to an example embodiment of the present application. The method 800 may be performed by a module such as VSAN module 114, as described above with reference to FIGS. 1-3 in some embodiments. In some other embodiments, the method may be performed by some other modules that reside in the hypervisor or outside of the hypervisor. In some embodiments, the method 800, part of process 400 may be performed by a submodule of the VSAN module and another part of the process may be performed by another submodule of the VSAN module.

Process 800 may start, at action 810, by mounting a first datastore identified by a first datastore identifier. The first datastore may be a logical datastore and the first datastore identifier may be a first container identifier (CID). The first datastore may be mounted by an object storage file system (OSFS) submodule of the VSAN module. The first datastore may be formatted with a file system, such as a virtual machine file system (VMFS) in some embodiments. The first datastore may include a first namespace object that is mapped to a first subfolder in the first datastore, as described above. In some embodiments, a first object (e.g., a storage object associated with the datastore) may be referenced by a first file (e.g., a descriptor file) within the first subfolder via a first object identifier of the first object. The first object identifier may be a UUID assigned to the first object when the object is created. Furthermore, the first object may also be tagged with the first datastore identifier (e.g., the CID of the datastore with which the first object is associated).

At action 820, a second datastore identified by a second datastore identifier may be mounted. The second datastore may be a logical datastore and the second datastore identifier may be a second CID. The second datastore may be mounted by the OSFS. The second datastore may be formatted with a file system, such as the VMFS in some embodiments. The second datastore may include a second namespace object that is mapped to a second subfolder in the second datastore, as described above. In some embodiments, a second object (e.g., a storage object associated with the datastore) may be referenced by a second file (e.g., a descriptor file) within the second subfolder via a second object identifier of the second object. The second object identifier may be a UUID assigned to the second object when the object is created. Furthermore, the second object may also be tagged with the second datastore identifier (e.g., the CID of the datastore with which the second object is associated). In some embodiments, the first datastore and the second datastore may share an underlying physical storage and may be configurable with separate access permissions, as described in detail above.

Process 800 may then receive, at action 830, a command to access the first object via a file associated with a datastore identifier (e.g., via a descriptor file associated with a datastore, through which a user may request access to the object). Process 800 may compare the datastore identifier (e.g., of the requestor descriptor file) with the first datastore identifier based on the first object being tagged with the first datastore identifier. That is, the CID extracted from the descriptor file of the requestor may be compared with the CID with which the first object is tagged (e.g., the CID that is stored in the objPath variable in the first object's metadata).

At action 840, process 800 may determine whether the datastore identifier matches the first datastore identifier. That is, process 800 may determine whether the CID extracted from the descriptor file from which the request/command is received matches the CID with which the first object is tagged. If process 800 determines that the datastore identifier does not match the first datastore identifier, process 800 may disallow, in action 850, access to the first object (e.g., because an unauthorized user has tampered with the descriptor file). On the other hand, if process 800 determines that the datastore identifier matches the first datastore identifier, process 800 may allow, at action 860, access to the first object (e.g., because an authorized user with a proper descriptor file is requesting the access). The process may then end.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for providing access to objects in an object based storage, the method comprising:

mounting a first datastore identified by a first datastore identifier, the first datastore being formatted with a file system, the first datastore comprising a first namespace object mapped to a first subfolder in the first datastore, wherein a first object is (i) referenced by a first file within the first subfolder via a first object identifier of the first object, and (ii) tagged with the first datastore identifier;

mounting a second datastore identified by a second datastore identifier, the second datastore being formatted with the file system, the second datastore comprising a second namespace object mapped to a second subfolder in the second datastore, wherein a second object is (i) referenced by a second file within the second subfolder via a second object identifier of the second object, and (ii) tagged with the second datastore identifier, wherein the first datastore and the second datastore share an underlying physical storage and are configurable with separate access permissions;

receiving a command to access the first object via a file associated with a datastore identifier;

comparing the datastore identifier with the first datastore identifier with which the first object is tagged;

when the datastore identifier matches the first datastore identifier, allowing access to the first object;

when the datastore identifier does not match the first datastore identifier, disallowing access to the first object; and calculating a total capacity of the first datastore and the second datastore by skipping the second datastore based on the second datastore being an alias of the first datastore.

2. The method of claim 1, wherein the file is associated with the datastore identifier based on the file having a descriptor path associated with the first datastore.

3. The method of claim 1, wherein the first datastore is not an alias of any other datastore, and wherein the second datastore is an alias of the first datastore.

4. The method of claim 1, wherein the first namespace object corresponds to a virtual machine, and wherein the first file comprises a virtual disk descriptor file that references a virtual disk of the virtual machine via the first object identifier associated with the virtual disk.

5. The method of claim 1, wherein the first datastore identifier comprises a container identifier (CID), and wherein the first object identifier comprises a universally unique identifier (UUID).

6. The method of claim 1, further comprising mounting a third datastore identified by a third datastore identifier, the third datastore being formatted with the file system, the third datastore comprising a third namespace object mapped to a third subfolder in the third datastore, wherein a third object is (i) referenced by a third file within the third subfolder via a third object identifier of the third object, and (ii) tagged with the third datastore identifier, wherein the first datastore, the second datastore, and the third datastore (i) share the underlying physical storage, and (ii) are configurable with separate access permissions.

7. The method of claim 1, wherein the file system comprises a virtual machine file system (VMFS), and wherein the mounting of the first datastore and the second datastore is performed by an object storage file system (OSFS).

8. A non-transitory computer readable medium comprising instructions that, when executed by one or more processors of a computing system, cause the computing system to perform a method of providing access to objects in an object based storage, the method comprising:

mounting a first datastore identified by a first datastore identifier, the first datastore being formatted with a file system, the first datastore comprising a first namespace object mapped to a first subfolder in the first datastore, wherein a first object is (i) referenced by a first file within the first subfolder via a first object identifier of the first object, and (ii) tagged with the first datastore identifier;

mounting a second datastore identified by a second datastore identifier, the second datastore being formatted with the file system, the second datastore comprising a second namespace object mapped to a second subfolder in the second datastore, wherein a second object is (i) referenced by a second file within the second subfolder via a second object identifier of the second object, and (ii) tagged with the second datastore identifier, wherein the first datastore and the second datastore share an underlying physical storage and are configurable with separate access permissions;

receiving a command to access the first object via a file associated with a datastore identifier;

comparing the datastore identifier with the first datastore identifier with which the first object is tagged;

when the datastore identifier matches the first datastore identifier, allowing access to the first object;

when the datastore identifier does not match the first datastore identifier, disallowing access to the first object; and calculating a total capacity of the first datastore and the second datastore by skipping the second datastore based on the second datastore being an alias of the first datastore.

9. The non-transitory computer readable medium of claim 8, wherein the file is associated with the datastore identifier based on the file having a descriptor path associated with the first datastore.

10. The non-transitory computer readable medium of claim 8, wherein the first datastore is not an alias of any other datastore, and wherein the second datastore is an alias of the first datastore.

11. The non-transitory computer readable medium of claim 8, wherein the first namespace object corresponds to a virtual machine, and wherein the first file comprises a virtual disk descriptor file that references a virtual disk of the virtual machine via the first object identifier associated with the virtual disk.

12. The non-transitory computer readable medium of claim 8, wherein the first datastore identifier comprises a container identifier (CID), and wherein the first object identifier comprises a universally unique identifier (UUID).

13. The non-transitory computer readable medium of claim 8, wherein the method further comprises mounting a third datastore identified by a third datastore identifier, the third datastore being formatted with the file system, the third datastore comprising a third namespace object mapped to a third subfolder in the third datastore, wherein a third object is (i) referenced by a third file within the third subfolder via a third object identifier of the third object, and (ii) tagged with the third datastore identifier, wherein the first datastore, the second datastore, and the third datastore (i) share the underlying physical storage, and (ii) are configurable with separate access permissions.

14. The non-transitory computer readable medium of claim 8, wherein the file system comprises a virtual machine file system (VMFS), and wherein the mounting of the first datastore and the second datastore is performed by an object storage file system (OSFS).

15. A computer system, comprising:
a memory; and
a processor coupled to the memory, the processor being configured to:
mount a first datastore identified by a first datastore identifier, the first datastore being formatted with a file system, the first datastore comprising a first namespace object mapped to a first subfolder in the first datastore, wherein a first object is (i) referenced by a first file within the first subfolder via a first object identifier of the first object, and (ii) tagged with the first datastore identifier;
mount a second datastore identified by a second datastore identifier, the second datastore being formatted with the file system, the second datastore comprising a second namespace object mapped to a second subfolder in the second datastore, wherein a second object is (i) referenced by a second file within the second subfolder via a second object identifier of the second object, and (ii) tagged with the second datastore identifier, wherein the first datastore and the second datastore share an underlying physical storage and are configurable with separate access permissions;
receive a command to access the first object via a file associated with a datastore identifier;
compare the datastore identifier with the first datastore identifier with which the first object is tagged;
when the datastore identifier matches the first datastore identifier, allow access to the first object;
when the datastore identifier does not match the first datastore identifier, disallow access to the first object; and
calculate a total capacity of the first datastore and the second datastore by skipping the second datastore based on the second datastore being an alias of the first datastore.

16. The computer system of claim 15, wherein the first namespace object corresponds to a virtual machine, and wherein the first file comprises a virtual disk descriptor file that references a virtual disk of the virtual machine via the first object identifier associated with the virtual disk.

17. The computer system of claim 15, wherein the file system comprises a virtual machine file system (VMFS), and wherein the mounting of the first datastore and the second datastore is performed by an object storage file system (OSFS).

18. The computer system of claim 15, wherein the first namespace object corresponds to a virtual machine, and wherein the first file comprises a virtual disk descriptor file that references a virtual disk of the virtual machine via the first object identifier associated with the virtual disk.

* * * * *